UNITED STATES PATENT OFFICE.

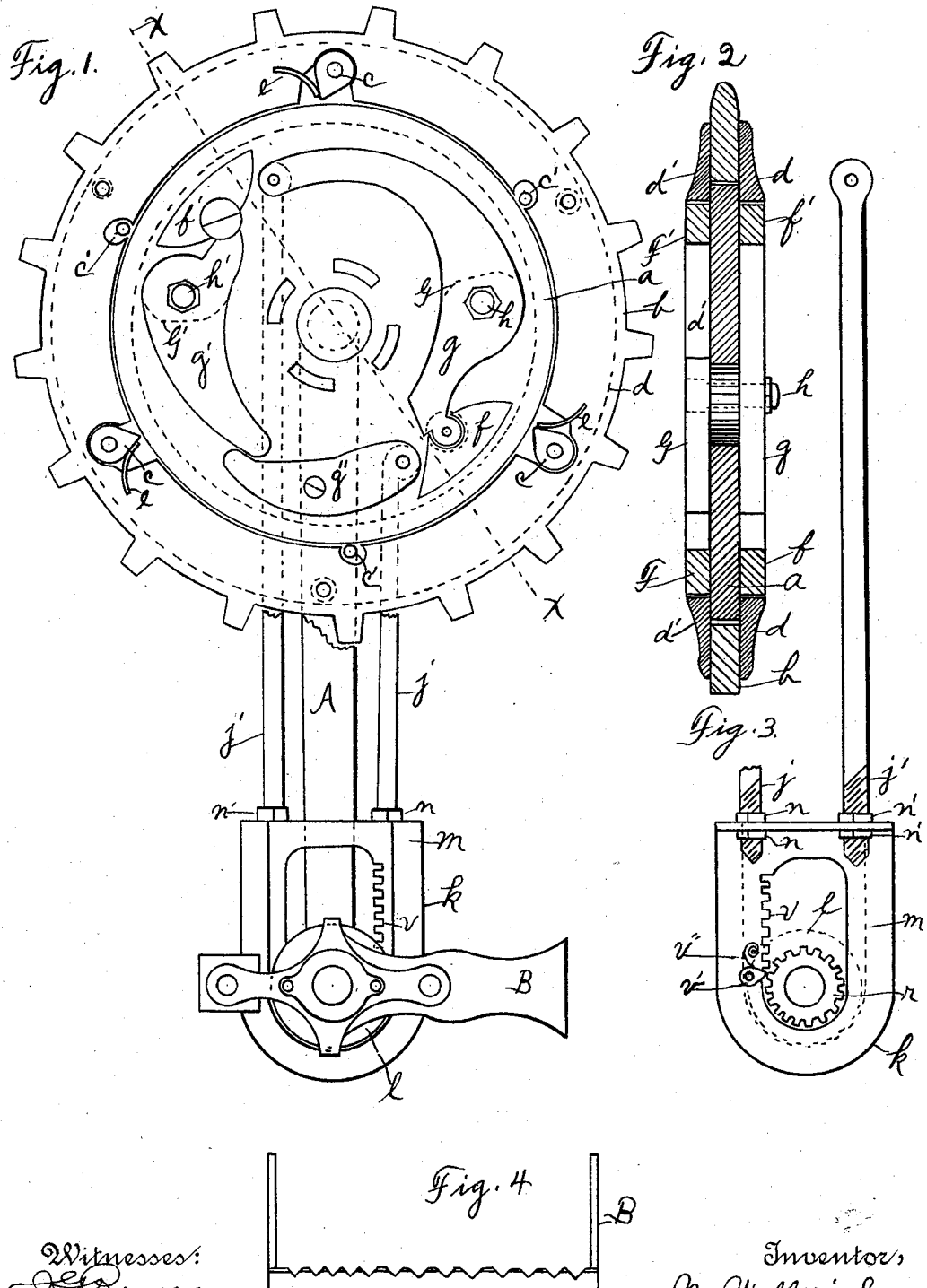

NICHOLAS WALLERICH, OF FORT WORTH, TEXAS.

BRAKE AND COASTING SPROCKET-WHEEL FOR VELOCIPEDES.

SPECIFICATION forming part of Letters Patent No. 589,149, dated August 31, 1897.

Application filed June 16, 1896. Serial No. 595,804. (No model.)

*To all whom it may concern:*

Be it known that I, NICHOLAS WALLERICH, a citizen of the United States, residing at Fort Worth, Texas, have invented a Brake and Coasting Sprocket-Wheel for Velocipedes, of which the following is a specification.

My invention relates to improvements in sprocket-wheels; and the object is to construct a combined coasting and driving wheel with brake attachments for stopping velocipedes, whether coasting or whether the velocipede is being propelled by some kind of motive power, by which a person can coast by simply stopping the motion of the pedals and holding the pedals still with the feet; and I accomplish these objects by the combination of the mechanism hereinafter fully described, and more particularly pointed out in the claims.

Reference is had to the accompanying drawings, forming a part of this specification.

Figure 1 is a side elevation of a sprocket-wheel and pedal, showing my attachments, some of the parts being represented by dotted lines. Fig. 2 is a sectional view through the line $x\,x$ of Fig. 1, showing the part to the right of the dotted line. Fig. 3 is a view of the pedal attachment, one of the link-rods being broken. Fig. 4 is a detailed view in perspective.

The invention consists of a wheel $a$ within a sprocket-wheel $b$. Wheel $a$ is propelled as all sprocket-wheels for velocipedes are propelled. Wheel $b$ is propelled by means of cams $c\,c\,c$ and $c'\,c'\,c'$. Recesses are cut in wheel $b$ for the cams. The cams $c'\,c'\,c'$ consist of rollers as long as the wheel is thick, operating in elliptical recesses, which have openings next to wheel $a$. These rollers are to be just small enough to revolve freely in the end of the recesses and are held in place by the circular flanges $d\,d'$, which are bolted to wheel $b$. Cams $c\,c\,c$ are held on pivot-bearings which are journaled in the flanges $d\,d'$. The flanges $d$ and $d'$ have broad shoulders on the inner circle of the flanges. These cams are pressed against wheel $a$ by springs $e\,e\,e$ while the wheel $b$ is being propelled. Wheel $a$ is attached to a pedal-shaft just as any sprocket-wheel is attached. In propelling velocipedes wheel $b$ presses all the cams against wheel $a$. This action locks the two wheels together and they run as one wheel.

When it is desired to coast, the velocipede is started. After sufficient speed is attained stop pedaling and hold the pedals still with the feet, when the cams $c'\,c'\,c'$ will release the wheel $a$ and roll back to the other ends of their recesses. Springs $e\,e\,e$ will allow cams $c\,c\,c$ to release wheel $a$, so that wheel $b$ will revolve without carrying wheel $a$.

Wheel $a$ is adapted to remain stationary while sprocket-wheel $b$ revolves, the two wheels being in the same plane. Two annular flanges $d$ and $d'$ are bolted to wheel $b$. These flanges have four functions. They cause wheel $b$ to revolve in the same plane as that occupied by wheel $a$, they constitute a location for mounting the pivot-bolts of cams $c\,c\,c$, and they hold cams $c'\,c'\,c'$ in the elliptical recesses. These flanges constitute also surfaces for the brake-shoes. When wheel $a$ is driven by the pedals, all the cams will engage wheel $a$, thus locking the two wheels together, and they run as one wheel. When it is desirable to coast, stop pedaling and hold the pedals still with the feet. All the cams will release wheel $a$ and wheel $b$ will revolve, the flanges $d$ and $d'$ holding wheel $b$ in the plane with wheel $a$.

Constructing the wheel in two sections, sprocket $b$ and the inner wheel $a$, with removable flanges, makes it possible and practical to mount the cams in sprocket $b$. If the flanges were not removable, the recesses for the cams could not be made in sprocket $b$. It will be noticed that the inner rims of the flanges are broad, making sufficient surfaces for the brake-shoes.

The brake mechanism consists of devices attached to wheel $a$ and to one of the pedals. Two brake-shoes $f\,f'$ are pivoted on two brake-levers $g\,g'$, which are pivoted on wheel $a$ by bolts $h\,h'$, levers $g\,g'$ being rigid on bolts $h\,h'$. The face of the brake-shoes $f\,f'$ F F', if necessary, may be covered with any suitable material to increase the friction. Compound levers consisting of parts $g'$ and $g''$ are used to operate brake-shoe $f'$. Brake link-rods $j\,j'$ connect the brake-levers $g'$ and $g''$ with a sliding bracket $k$. These rods are made adjustable to bracket $k$ by means of nuts $n\,n$.

and $n'$ $n'$. Rack $k$ has a shoulder $m$, which constitutes a bearing for the flange $l$, this flange being rigid with the pedal. A cog-wheel $r$ is also mounted rigidly on the pedal. This cog meshes with rack $v$. At the lower end of rack $v$ is pivoted a cam $v'$, pressed against cog $r$ by a coil-spring $v''$. This cam and coil-spring are mounted in a recess cut in bracket $k$. This cam is to aid cog $r$ in engaging with rack $v$. In Fig. 3 cog $r$ is to turn in the direction of the hands of a clock. When the pedal-crank is reversed, cam $v'$ will prevent cog $r$ from turning without engaging rack $v$. Opposite brake-shoes $f$ and $f'$ are corresponding brake-shoes F and F', which are adapted to press against flange $d'$. These shoes are operated by brake-levers G and G', being shown only in dotted lines in Fig. 1. These levers have no extending arms, but are operated by the square heads on bolts $h$ and $h'$. Square recesses are made in levers G and G' for these bolts. The brake-shoes are pivoted on the brake-levers and held in place by screw-bolts. In the drawings the screw-bolt is left off of brake-shoe $f$ and shown in dotted lines. The pedal-crank A and link-rods $j$ $j'$ are shown by dotted lines, so that the parts under these rods might be illustrated without a separate figure. A foot-bar B is attached to the pedal, the upper front edge of which is serrated, so that the foot will not slip off. The operation of the brake mechanism is as follows: The ordinary motion of the sprocket-wheel is from left to right, as the hands of a clock. This makes the motion of the pedals from right to left on their axles.

In applying the brakes reverse the motion of the pedals. This will produce a motion from left to right of the pedals and a motion from right to left of the sprocket-wheel. In doing this the wheel $r$ will engage rack $v$. The bar B is attached so that sufficient lever-power may be utilized in throwing on the brakes. This is done by pressing on the serrated part of the bar and keeping it in a straight line while the wheel is being reversed. This will draw bracket $k$ down, and with bracket $k$ come link-rods $j$ and $j'$, bringing brake-levers $g$ and $g'$. This throws brake-shoes $f$ and $f'$ and F and F' against the shoulders of flanges $d$ and $d'$. The braking may be done at any point of the circumference of the circle made by the pedal.

Modifications in the manner of attaching wheel $a$ to pedal-shafts are to be made, so that my invention can be attached to any style of velocipedes. The several parts are to be made of suitable material and to any size practical.

Having fully described my invention what I claim as new, and desire to secure by Letters Patent, is—

1. A sprocket-wheel constructed in an outer and an inner section capable of independent rotation and provided with circular flanges bolted to said outer section, said flanges having broad shoulders on their inner rims, brake-levers pivoted on said inner section, and brake-shoes pivoted on said levers and adapted to be pressed against said flanges, and means adapted to operate said levers.

2. A sprocket-wheel composed of two sections capable of independent rotation provided with braking mechanism consisting of levers pivoted on the inner section, brake-shoes pivoted on said levers, link-rods pivoted to said levers, a cog-wheel mounted on the pedal-shaft and a bracket provided with a rack to mesh with said cog, said link-rods being adjustable to said bracket by means of nuts.

3. In a sprocket and coasting wheel the combination of two sections forming said wheel, one section running within the other, the outer section being provided with spring-pressed cams adapted to lock said sections while being propelled and to release the same for coasting, circular flanges bolted to the outer section, brake-levers mounted on the inner section and having brake-shoes pivoted thereon, link-rods pivoted on said levers, and a bracket mounted on the pedal connected to said levers and provided with a rack and cog, said cog being rigid with the pedal and normally out of engagement with said rack.

4. A braking mechanism for velocipedes consisting of levers mounted on one section of a sprocket-wheel and brake-shoes pivoted on said levers and adapted to operate on the other section of said wheel, and link-rods mounted on the pedal adapted to operate said levers by a reverse motion of the pedal-crank, one of said wheel-sections being adapted to run outside of and independently of the other.

5. In a sprocket-wheel provided with annular shoulders on the rim, said wheel consisting of an outer rim and a central portion, levers having shoes pivoted on said central portion adapted to engage said shoulders, a bracket provided with a cog and rack mounted on the pedal, and link-rods connecting said bracket and said levers.

6. A sprocket and coasting wheel constructed in two sections and provided with locking-cams for said sections, brake-levers, a bracket provided with a rack, a cog and a flange, said cog and flange being rigidly mounted on the pedal, link-rods connecting said bracket to said levers, said bracket having a shoulder rigid therewith and constituting a bearing for said flange.

7. A sprocket and coasting wheel composed of two sections and provided with locking-cams for said sections and brake-levers, a bracket provided with a rack and a cog, said cog being rigidly mounted on the pedal, a spring-pressed cam mounted in a recess in said bracket and adapted to engage said cog, and link-rods connecting said bracket to said levers.

NICHOLAS WALLERICH.

Witnesses:
FRED A. BEALL,
A. W. CHANEY.